May 31, 1949.  E. J. RAPP ET AL  2,471,703

MOLDING AND PACKAGING MACHINERY

Filed Jan. 31, 1946  5 Sheets-Sheet 5

INVENTORS.
Earl J. Rapp,
BY Harold R. Coon, Sr.
Bair & Freeman
Attys.

Patented May 31, 1949

2,471,703

UNITED STATES PATENT OFFICE 2,471,703

MOLDING AND PACKAGING MACHINERY

Earl J. Rapp and Harold R. Coon, Sr., Toledo, Ohio, assignors to Lynch Corporation, a corporation of Indiana Application January 31, 1946, Serial No. 644,625

9 Claims. (Cl. 31—8)

1

This invention relates to molding and packaging machinery and particularly to machinery for molding and packaging semi-viscous or semi-plastic materials such as butter, lard, or the like, in print form.

This invention provides an improvement over the construction shown in Heft et al., Patent #2,258,288, issued October 7, 1944. Furthermore, the machine to which the improvement is specifically applied is substantially shown in the co-pending application of Earl J. Rapp et al., Serial Number 593,708, filed May 14, 1945, and assigned to the Lynch Manufacturing Corporation.

One of the problems which has been prevalent in the automatic packaging of materials such as butter, cheese or lard, has been the difficulty of maintaining a suitable weight for each mold of the material made. This is due primarily to entrapped air, usually in the upper corners of each mold which prevented the material being packed from entering the spaces mentioned. Placing a small extra amount of the material in each mold proved unsatisfactory because some of the articles molded did not have entrapped air and the loss of material in packaging thousands of pounds of butter or lard a week was too large. If the packages are underweight, on the other hand, they must be repacked.

Merely venting the mold during the time the material is entering, as shown in the aforesaid Heft et al. patent, is not completely satisfactory because the valve must close before the material completely fills the mold, and small amounts of entrapped air were still present in some instances.

This invention, therefore, has as its main object the accurate control of the amount of material molded on every molding operation of the molding machine and effective elimination of air pockets in the molding process.

Another object of the invention is to provide an improved rotary valve structure and leverage system for the mold of a packaging machine for packaging semi-viscous or semi-plastic materials.

A further object of the invention is to provide an improved system for venting the mold of such machines at each molding operation.

Still another object of the invention is to properly time the operation of the valves in an air venting system for a packaging machine for semi-viscous or semi-plastic materials, so that there is very little waste of material due to the venting operation even though substantially all entrapped air is effectively removed.

With these and other objects in view, our invention consists in the construction, arrangement

2 and combination of the various parts of our device whereby the objects contemplated are attained, as hereinafter more fully set forth, pointed out in our claims and illustrated in the accompanying drawings, wherein:

Figure 1:
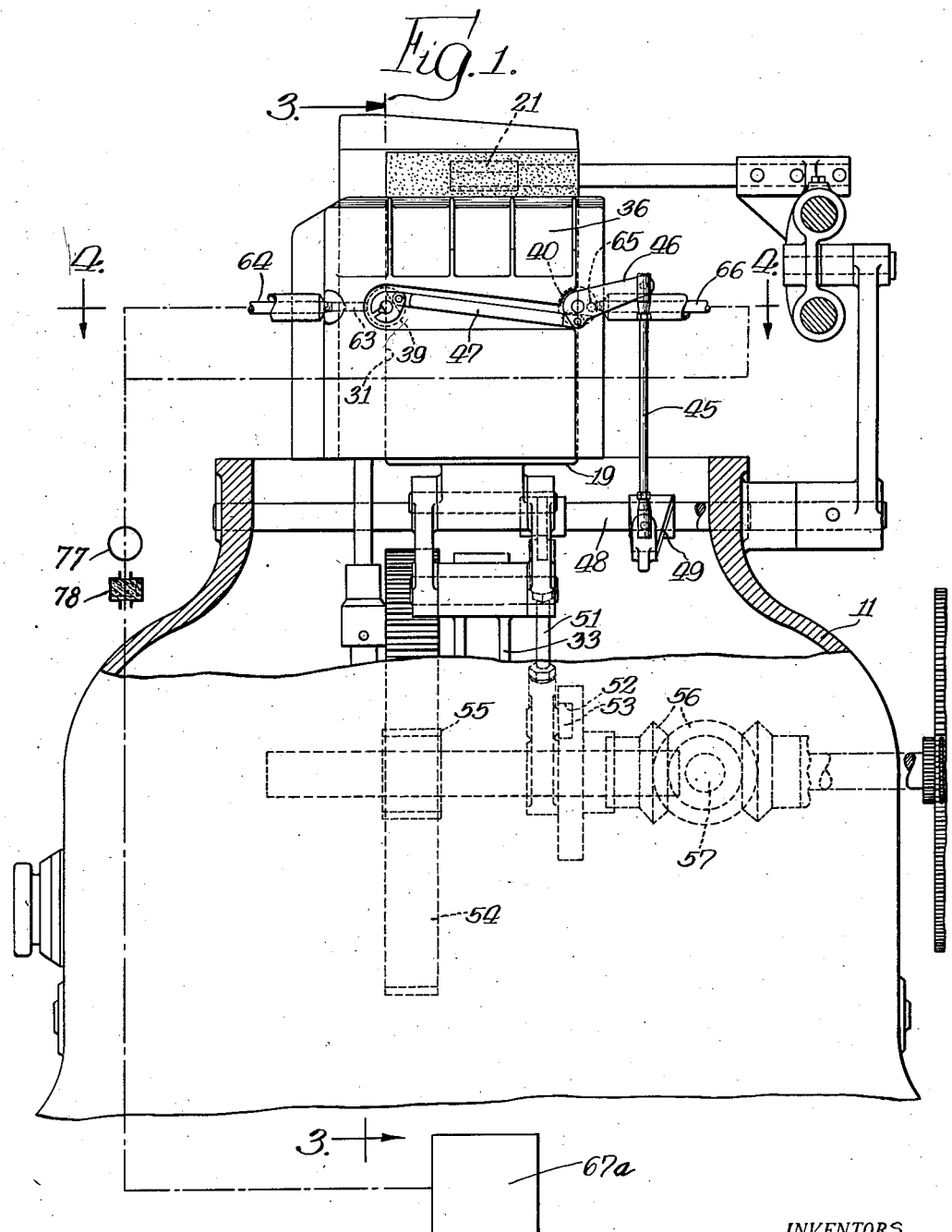
Fig. 1 is a view showing parts of the packaging machine in elevation and parts in section and illustrates the application of a preferred embodiment of the invention to a molding or packaging machine.

Referring specifically to the drawings for a detailed description of the invention, numeral 11 designates a supporting base for the machine which houses generally the actuating gears and levers for the molding and packaging elements. In these drawings only the molding portion of the packaging machine is illustrated because the present invention is confined to improvements therein.

Mounted above the supporting base is a hopper 12 into which the material to be packaged is charged and fed into a chamber 14 containing spiral feeding members 15 and 16, a compressing chamber 17, a mold generally indicated at 18, an ejecting elevator 19 and a ram 21 for removing the mold or print from the elevator 19.

Figure 3:
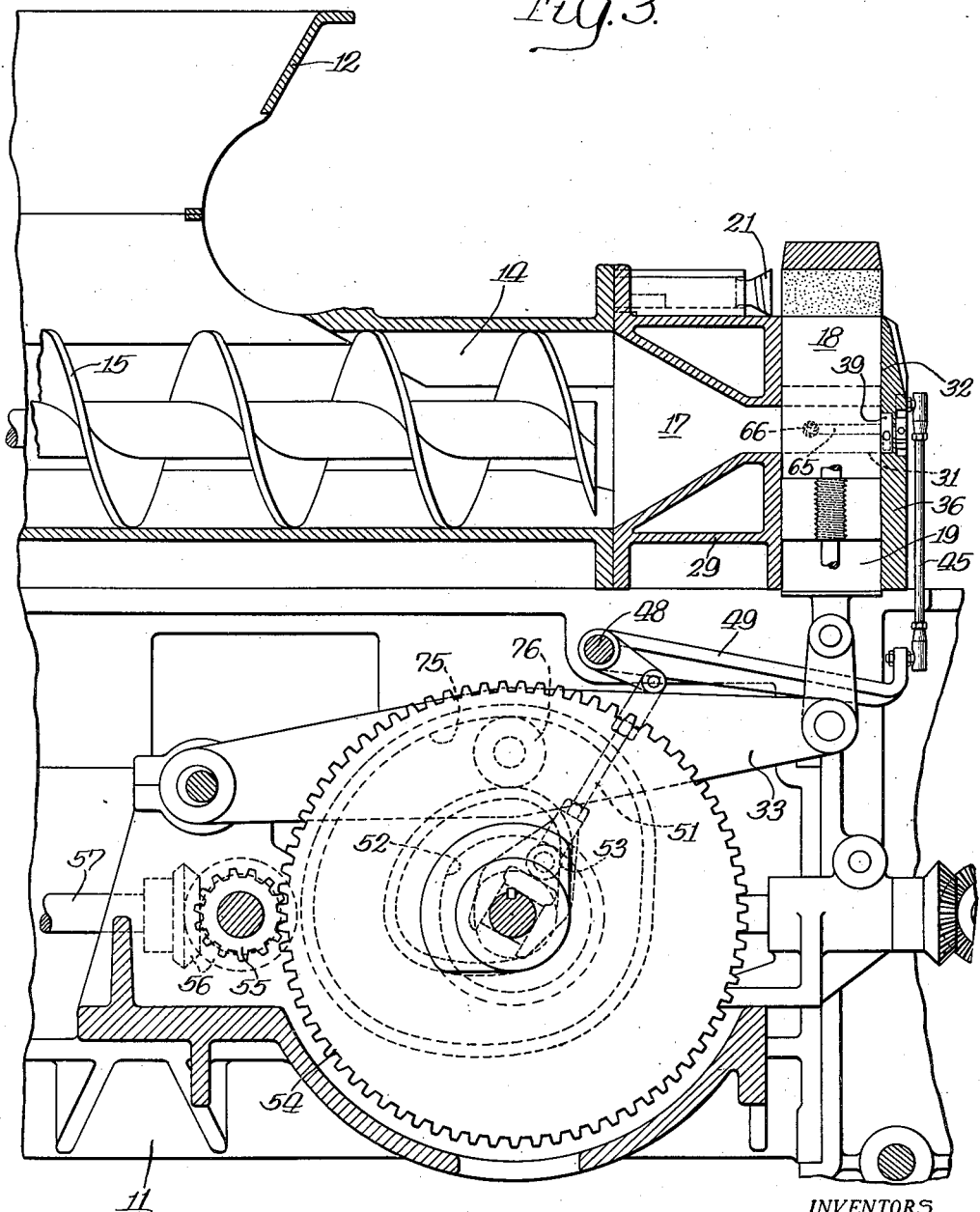
Fig. 3 is a vertical sectional view of a portion of the packaging machine taken on line 3—3 of Fig. 1.
Figure 4:
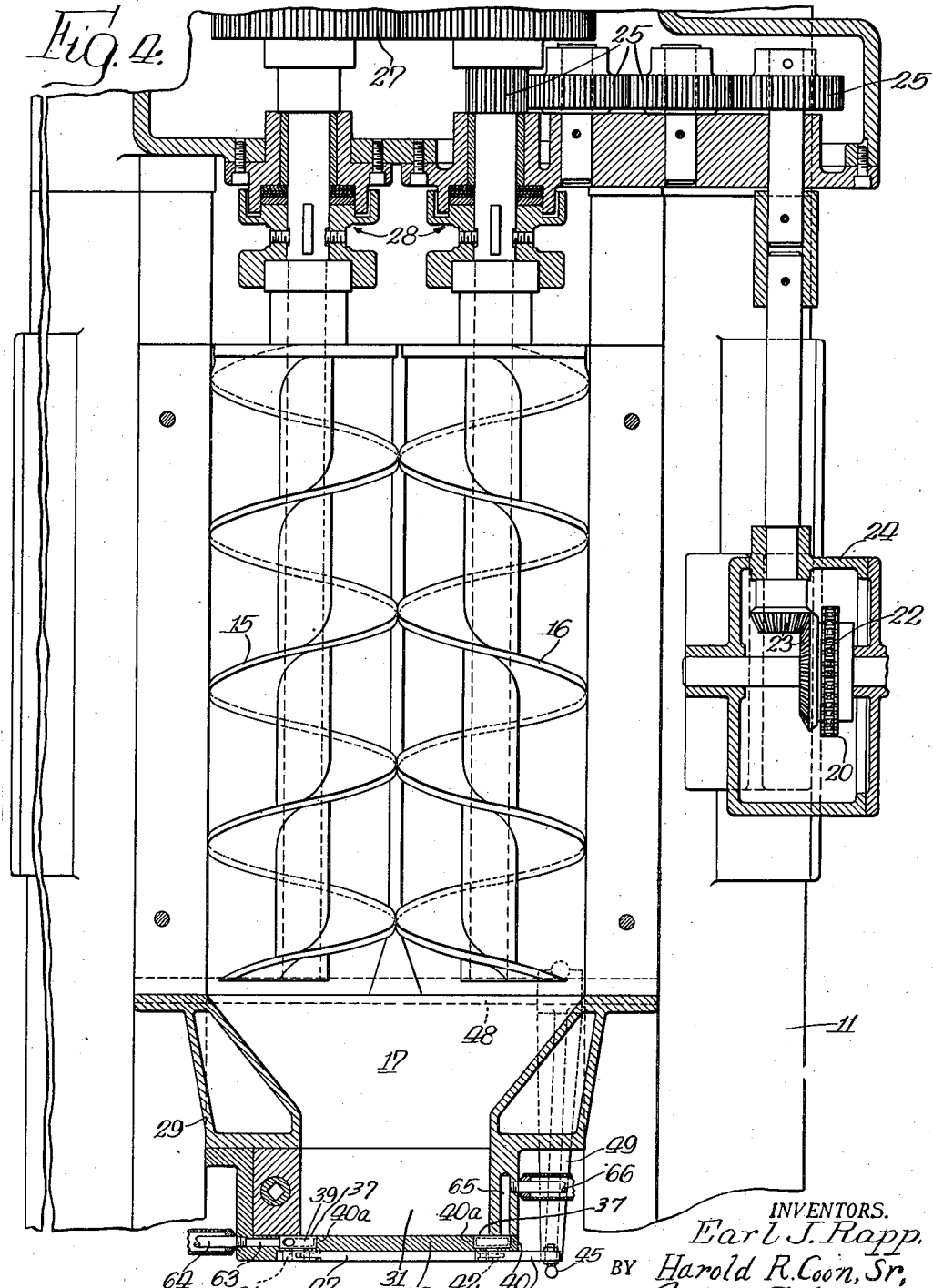
Fig. 4 is a horizontal sectional view of a portion of the packaging machine taken on line 4—4 of Fig. 1.

The spiral feed members 15 and 16 which are preferably formed of metal are driven by a chain 20 which rotates a sprocket wheel 22. Bevel gears 23 driven from a main drive shaft (not shown), are contained in a casing 24 and rotate pinion gears 25 to in turn rotate the spiral feed member 16. Feed member 16 has a gear thereon which engages a gear 27 on the feed member 15 and thus the feed member 15 is rotated when feed member 16 is operated by gears 23 and 25. Suitable bearings and packing generally indicated at 28 are provided for the spiral feed members 15 and 16. The spiral feed members 15 and 16 are recurrently rotated by the bevel gears 23 to feed a charge of the material to the mold 18 and thereafter stop until the mold has discharged a print and has returned to its material receiving position, whereupon the feed members 15 and 16 are again rotated to deliver another charge. As stated, the mold casing 18 is mounted on the base 11 and includes a casting 29 in which the compressing member 17 is formed. The chamber 17 tapers inwardly from the feed members 15 and 16 and is aligned with the mold or print cavity 31 as best shown in Figs. 1 and 3. The mold cavity 31 is formed in the mold casing 18 and is preferably rectangular in cross section and elongate in a horizontal direction. The mold casing 18 is mounted for vertical reciprocating movement in an open ended guide 32 in which the mold casing 18 fits snugly and substantially air tight. The lower end of the mold casing 18 is connected to the elevator 19 and the elevator 19 is pivotally connected to a link 33 which imparts recurrent reciprocating motion to the elevator 19 and the mold casing 18 in a manner hereinafter described, so that when the mold cavity 31 is filled with material the mold casing 18 is raised and the print ejected by the ram 21. For this purpose, the mold cavity 31 is open at its front and rear ends.

Formed in a front wall of plate 36, substantially in alignment with the upper corners of the mold cavity 31 when in its material receiving position, are substantially round vent openings or ports 37. The round vent openings 37 are adapted to be opened and closed by rotary valves 39 and 40 which are contained in cavities 40a in the front plate 36. The rotary valves 39 and 40 are provided with stub shafts 41 and 42 respectively which extend outwardly from the front plate 36 and are provided with flats 43 and 44 respectively. The rotary valves are rotated in opposite directions by a reciprocating rod 45, which is connected to an operating arm 46, which is in turn attached to the stub shaft 42 of the right hand rotary valve and turns said valve through the medium of the flat 44. The lever arm 47 is pivotally and eccentrically attached to the left hand rotary valve 39, and movement thereof rotates the rotary valve 39. The lever arm 47 is disposed at an angle with respect to the arm 46 and is pivoted thereto so that it moves in the opposite directions from the arm 46 when the rod 45 is reciprocated. The rod 45 is connected to a shaft 48 through an arm 49 and the shaft 48 has recurrent rotating motion imparted thereto by a rod 51 through a cam track 52, on which a roller 53 rides, which roller is secured to the rod 51. The cam track 52 is rotated by movement of a large gear wheel 54 driven from a smaller gear 55. The small gear 55 is in turn driven by bevel gears 56 which are rotated by a power shaft 57.

Figure 2:
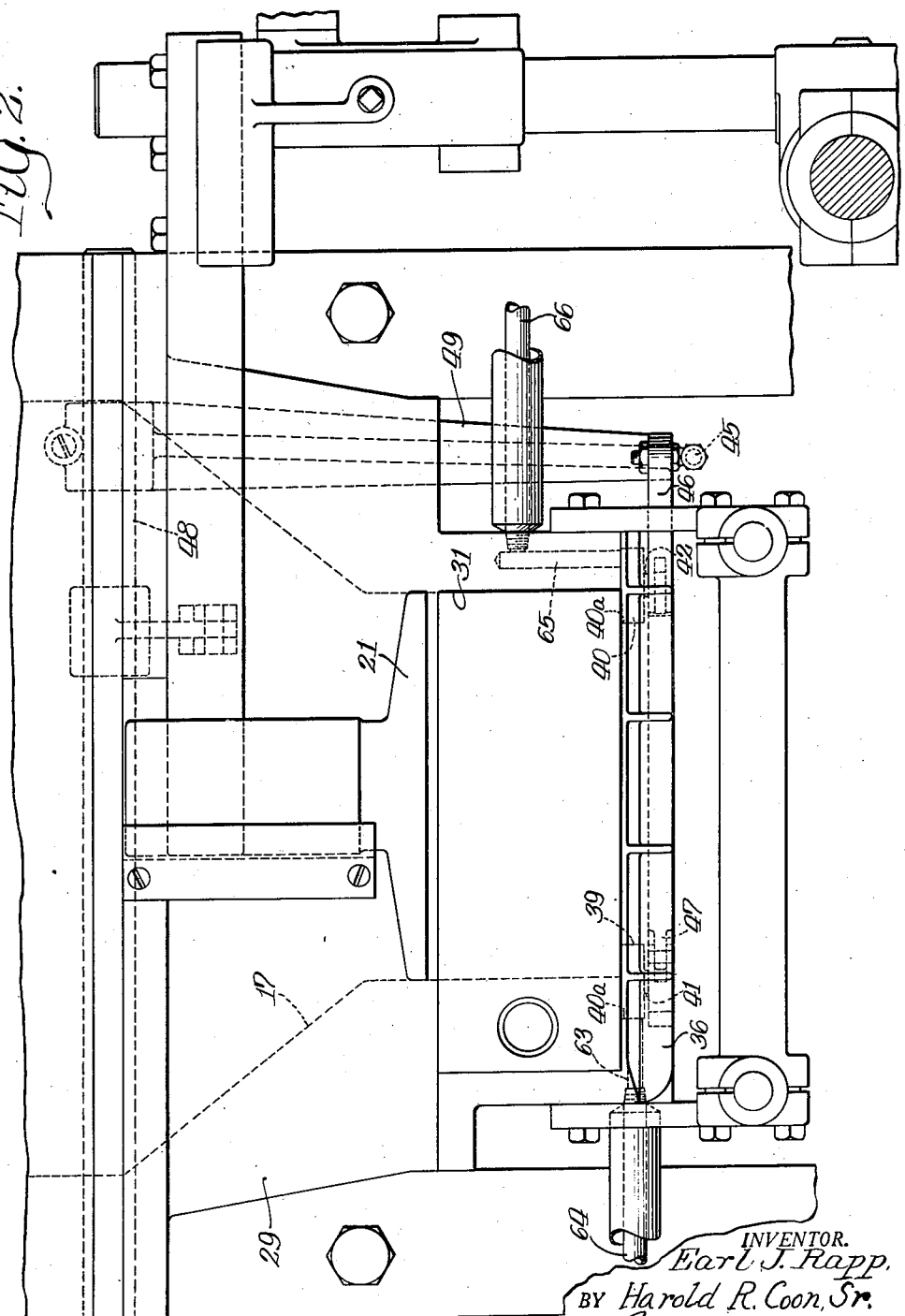
Fig. 2 is a top plan view showing a portion of the packaging machine illustrated in Fig. 1.

As shown in Figures 1 and 2, a passageway 63 is provided on one side of the front plate 36, which passageway has a conduit 64 connecting therewith. Another passageway 65 is provided in the casting 29 and also communicates with the conduit 66 extending outwardly from the casting 29. Conduits 64 and 66 communicate with a vacuum pump shown diagrammatically at 67. The passageways 63 and 65 communicate at their other ends with the cavities 40a in which the rotary valves 39 and 40 are disposed.

Figure 5:
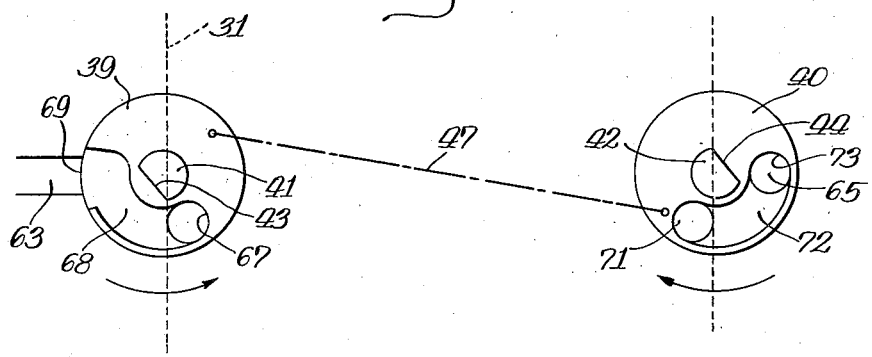
Fig. 5 is a diagrammatic view of the rotary valves and linkage showing the position of the ports when the mold is being vented.
Figure 6:
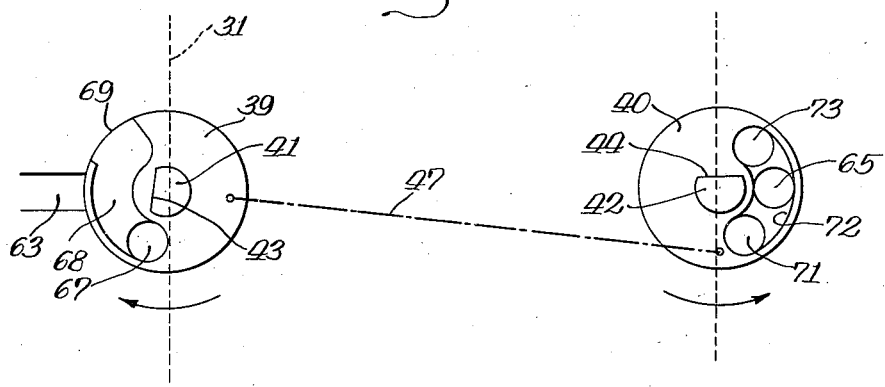
Fig. 6 is a similar diagrammatic view showing the position of the ports and linkage when the rotary valves are closed.
Figure 7:
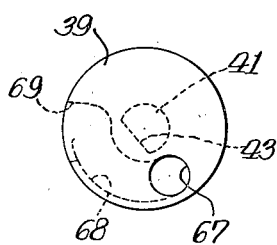
Fig. 7 is a front elevational view of the left hand rotary valve.
Figure 8:
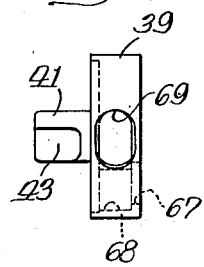
Fig. 8 is a side elevational view of the left hand rotary valve.
Figures 9, 10:
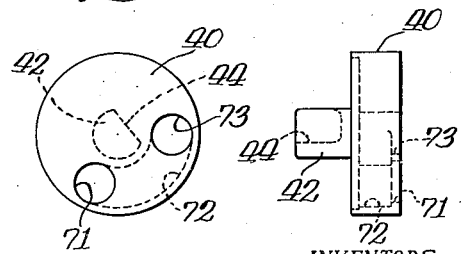
Fig. 9 is a front elevational view of the right hand rotary valve.
Fig. 10 is a side elevational view of the right hand rotary valve.

Referring now to Figures 5 and 6, Figure 5 shows the position of the valves 39 and 40 and the lever 47 when the valves are in the position to vent the mold cavity 31. The confines of the mold cavity are shown by the dotted lines in Figures 5 and 6. Referring also to Figures 7 and 10 inclusive, it will be noted that the left hand valve is provided with a port 67 which communicates with the mold chamber 31, when the valve is in the position shown in Figure 5. A passageway 68 is provided in the valve 39 and this passageway is provided with a port 69 in the side of the rotary valve as best shown in Figure 8. The port 69 in turn communicates with the passageway 63 and conduit 64 so that a vacuum is drawn at the upper left hand corner of the mold chamber 31 when port 67 is in communication therewith.

The right hand valve 40 is provided with a port 71 which communicates with the mold chamber 31 when in the position shown in Figure 5 and a passageway 72 in the valve 40 communicates with port 73 in the back flat surface of the valve 40. The port 73 in turn communicates with the passageway 65 and conduit 66 so that the upper right hand corner of the mold cavity 31 is subjected to vacuum when the valve 40 is in the position shown in Figure 5.

The linkage 47 is in the position shown in Figure 5 when both the rotary valves are open, and, as shown by the arrows in Figure 5, the valves rotate in opposite directions to open simultaneously. Referring to Figure 6, it will be seen that if the linkage 47 moves to the position shown, the valves 39 and 41 rotate in the opposite direction to close and the ports 67 and 71 are no longer in communication with the compartment 31 and it is, therefore, not subject to vacuum. Furthermore, the ports 69 and 73 are no longer in registry with the passageway 63 and 65 so that there is no vacuum leakage through the cavity 40a in plate 36.

In order to insure that all entrapped air is removed from the mold cavity 31 when the material is forced into the cavity, the cam track 52 maintains the rotary valves 39 and 40 in the open position during most of the time that the spiral feed members 15 and 16 are feeding material into the mold cavity. Valve opening and closing are preferably timed relative to the position of the mold casing 18. This is accomplished by imparting the proper contour to a cam track 75 in which a roller travels, which roller is secured to a lever 33 and reciprocates the same. The large gear 54 rotates both the cam tracks 52 and 75, thus insuring proper timing. Just before the mold casing 18 starts to move upwardly to the ejecting position, the cam track 52 effects closing of the valves 39 and 40. As soon as the mold cavity 31 reaches the position for filling, the feeding members 15 and 16 start to rotate and force material into the mold cavity tending to compress air therein. However, simultaneously with the initiation of feeding, the cam track 52 opens the valves 39 and 40 and any air in the mold cavity 31 is withdrawn through the valve ports 67 and 71 and through the passageways and conduits 63, 64, 65 and 66. Just prior to the time the mold casing 18 starts to move upwardly due to the contour of trackway 75 and the feeding members 15 and 16 stop rotating, the cam track 52 effects closing motion of the valves 39 and 40, so that the ports 67 and 71 are no longer in communication with the mold compartment 31, and so that no material is forced into the valve ports or passageways and conduits leading to the vacuum source. However, since the mold cavity 31 is substantially air tight the vacuum will remain therein after the valves 39 and 40 are closed and the vacuum will assist the material in the mold cavity to be forced and drawn therein and fill all spaces and corners of the cavity.

As shown diagrammatically in Figure 1 a conventional shut-off valve 77 and a filter 78 are provided in the line to the source of vacuum 67a. Preferably the shut-off valve 77 is opened and closed simultaneously with the rotary valves 39 and 40 by linkage mechanism connected to trackway 52 (not shown). The filter 78 may be of any type which will prevent the material being molded from passing to the vacuum source and clogging the conduits therein. The shut-off valve 77 also tends to prevent the material being molded from passing through the vacuum conduits at the time when the material being molded approaches front plate 36 of the molding cavity.

From the foregoing it will be apparent that we have provided an improved molding and packaging machine which insures that each print of the material to be molded and packaged is of the same weight and shape. This is accomplished by the improved rotary valves 39 and 40 and by the application of vacuum to said cavity to remove all entrapped air therefrom.

Some changes may be made in the construction and arrangement of the parts of our device without departing from the real spirit and purpose of our invention, and it is our intention to cover by our claims any modified forms of structure or use of mechanical equivalents which may be reasonably included within their scope without sacrificing any of the advantages thereof.

We claim as our invention:

1. In a machine for molding semi-plastic materials into prints including a source of vacuum, which machine includes an open ended mold movable to molding and ejecting positions for containing the material under pressure in the molding position, a front plate for closing said mold in the molding position, and a port in said front plate to vent air from the mold in the molding position; a rotary valve adapted to open and close said plate port, said front plate including a valve seat, means for rotating said rotary valve on said seat, said rotary valve having a port adapted to communicate with said port in the front plate and having another port to communicate with said source of vacuum to remove said air, and a passageway in the rotary valve for placing said valve ports in communication with each other.

2. In a machine for molding semi-plastic materials into prints including a source of vacuum, which machine includes an open ended mold movable to molding and ejecting positions for containing the material under pressure in the molding position, a front plate for closing said mold in the molding position, and ports in said front plate adjacent, one to each side of the mold to vent air from the mold in the molding position; rotary valves adapted to open and close said ports, said front plate including a pair of valve seats, means for rotating said valves on their respective seats, said rotary valves each having a port communicating with said port in the front plate and having another port communicating with said source of vacuum to remove said air, and a passageway in each of the rotary valves for placing the valve ports in communication with each other.

3. In a machine for molding semi-plastic materials into prints, which machine includes an open ended mold movable to molding and ejecting positions for containing the material under pressure in the molding position, a front plate for closing said mold in the molding position, and ports in said front plate adjacent, one to each side of the mold to vent air from the mold in the molding position; rotary valves adapted to open and close said ports, said front plate including a pair of valve seats, means for rotating said valves on their respective seats, said rotary valves each having a port communicating with said port in the front plate and having another port to afford removal of said air, and a passageway in each of the rotary valves for placing the valve ports in communication with each other, said ports in the front plate and said rotary valves being disposed adjacent the upper corners of the mold.

4. In a machine for molding semi-plastic materials into prints, which machine includes an open ended mold movable to molding and ejecting positions for containing the material under pressure in the molding position, a front plate for closing said mold in the molding position, ports adjacent opposite sides of the front plate to vent air from the mold in the molding position, a pair of rotary valves adapted to open and close said ports, said front plate including valve seats for said rotary valves, means for rotating said rotary valves on their valve seats, said rotary valves having ports adapted to communicate with said ports in the front plate and having other ports to afford removal of said air, and passageways in the rotary valves for placing the valve ports in communication with each other.

5. In a machine for molding semi-plastic materials into prints, which machine includes an open ended mold movable to molding and ejecting positions for containing the material under pressure in the molding position, a front plate for closing said mold in the molding position, ports adjacent opposite sides of the front plate to vent air from the mold in the molding position, a pair of rotary valves adapted to open and close said ports, said front plate including valve seats for said rotary valves, means for rotating one of said rotary valves in one direction on its valve seat and for rotating the other rotary valve in the opposite direction on its valve seat, said rotary valves having ports adapted to communicate with said ports in the front plate and having other ports affording removal of said air, and passageways in the rotary valves for placing the valve ports in communication with each other, said rotating means comprising an arm rigidly connected to one of said valves and an arm pivotally connected to both of said valves.

6. In a machine for molding semi-plastic materials into prints, which machine includes an open ended mold movable to molding and ejecting positions for containing the material under pressure in the molding position, a front plate for closing said mold in the molding position, ports adjacent opposite sides of the front plate to vent air from the mold in the molding position, a pair of rotary valves adapted to open and close said ports, said front plate including valve seats for said rotary valves, means for rotating one of said rotary valves in one direction on its valve seat and for rotating the other rotary valve in the opposite direction on its valve seat, said rotary valves having ports adapted to communicate with said ports in the front plate and having other ports affording removal of said air, and passageways in the rotary valves for placing the valve ports in communication with each other, said rotating means comprising an arm rigidly connected to one of said valves and an arm pivotally connected to both of said valves, means for operating said arms comprising a reciprocating rod, and an operating shaft, said rod being reciprocated by the movement of said shaft, and cam means for recurrently rotating said shaft in opposite directions.

7. In a machine for molding semi-plastic materials into prints, which machine includes an open ended mold movable to molding and ejecting positions for containing the material under pressure in the molding position, a front plate for closing said mold in the molding position, ports adjacent opposite sides of the front plate to vent air from the mold in the molding position, a pair of rotary valves adapted to open and close said ports, said front plate including valve seats for said rotary valves, means for rotating one of said rotary valves in one direction on its valve seat and for rotating the other rotary valve in the opposite direction on its valve seat, said rotary valves having ports adapted to communicate with said ports in the front plate and having other ports affording removal of said air, and passageways in the rotary valves for placing the valve ports in communication with each other, said rotating means comprising an arm pivotally connected to both of said valves, means for operating said arm comprising a reciprocating rod, and an operating shaft, said rod being reciprocated by the movement of said shaft, and cam means for recurrently rotating said shaft in opposite directions and means for recurrently disposing the mold in the molding and ejecting positions and for recurrently supplying material to said mold, said valve means being open during the major portion of the time that the material is being supplied to the mold under pressure and being closed while the mold is moved to the ejecting position and back to the molding position.

8. In a machine for molding semi-plastic materials into prints, which machine includes an open ended mold movable to molding and ejecting positions for containing the material under pressure in the molding position, a front plate for closing said mold in the molding position and a port in said front plate to vent air from the mold in the molding position; a rotary valve adapted to open and close said port, and including opposite flat surfaces and a peripheral surface, said front plate including a valve seat, means for rotating said rotary valve on said seat, said rotary valve having a port on one of its flat surfaces adapted to communicate with said port in the front plate and having another port in its periphery to afford removal of said air, and a passageway in the rotary valve for placing said valve ports in communication with each other.

9. In a machine for molding semi-plastic materials into prints, which machine includes an open ended mold movable to molding and ejecting positions for containing the material under pressure in the molding position, a front plate for closing said mold in the molding position and a port in said front plate to vent air from the mold in the molding position; a rotary valve adapted to open and close said port and including opposite flat surfaces and a peripheral surface, said front plate including a valve seat, means for rotating said rotary valve on said seat, said rotary valve having a port on one of its flat surfaces adapted to communicate with said port in the front plate and having another port in the opposite flat surface thereof to afford removal of said air, and a passageway in the rotary valve for placing said valve ports in communication with each other.

EARL J. RAPP.
HAROLD R. COON, Sr.

REFERENCES CITED

The following references are of record in the file of this patent:

UNITED STATES PATENTS

| Number | Name | Date |
|---|---|---|
| 71,730 | Filkins | Dec. 3, 1867 |
| 414,136 | Blanchard | Oct. 29, 1889 |
| 908,991 | Hammer | Jan. 5, 1909 |
| 2,064,514 | Balz | Dec. 15, 1936 |
| 2,258,288 | Heft et al. | Oct. 7, 1941 |
| 2,375,693 | Russell et al. | May 8, 1945 |